(No Model.)
L. ERNST.
PROCESS OF MAKING BEER.
No. 324,822. Patented Aug. 25, 1885.
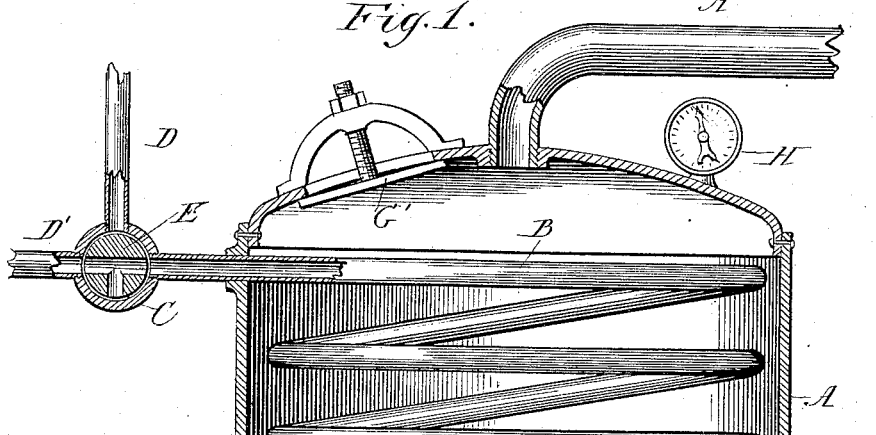
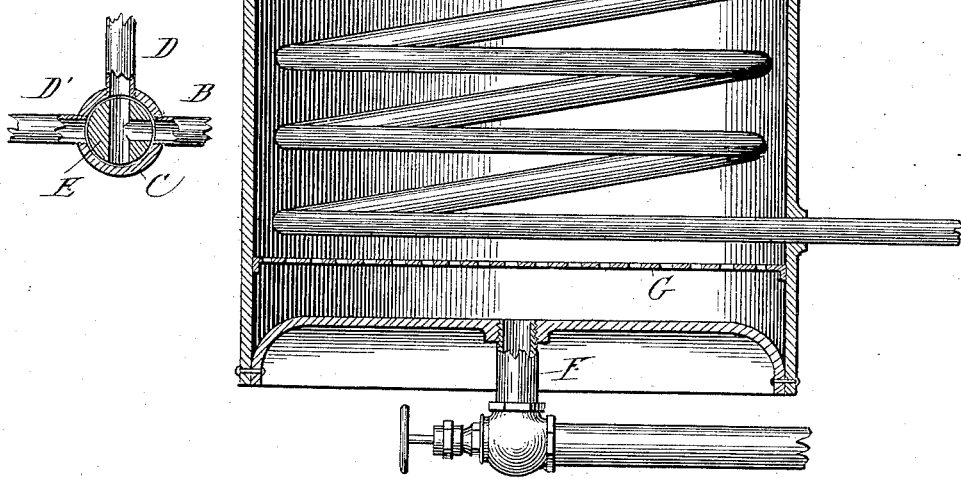
Witnesses
Frank J. Blanchard
Louis Nolting
Inventor
Leo Ernst
By Wm. H. Lotz & Co.
Atty.

UNITED STATES PATENT OFFICE.

LEO ERNST, OF CHICAGO, ILLINOIS.

PROCESS OF MAKING BEER.

SPECIFICATION forming part of Letters Patent No. 324,822, dated August 25, 1885.

Application filed January 31, 1885. (No model.)

*To all whom it may concern:*

Be it known that I, LEO ERNST, a citizen of the United States of America, residing at Chicago, in the county of Cook and State of Illinois, have invented certain new and useful Improvements in the Manufacture of Beer, of which the following is a specification, reference being had therein to the accompanying drawings.

My invention relates to a new and useful process for the manufacture of beer.

The object of the invention is to lessen the amount of hops used in the manufacture of beer, and at the same time retain all the beneficial features of the process now in use; and to the accomplishment of that end the invention consists of the process to be hereinafter described and claimed.

Reference will be made to the accompanying drawings, in which Figure 1 is a sectional view of a tank used in my process, and Fig. 2 a sectional detail of a three-way cock employed.

Heretofore in the manufacture of beer it has been customary to boil the wort and hops in an open boiler, and then pass the resulting product to the cooling device, a certain amount of high-grade (German) hops and a larger quantity of low-grade (American) hops being used in this process; but by the use of such an open boiler only about forty per cent. of the resinous and tannin substances of the hops could be extracted, and the aromatic oils were almost altogether wasted by passing off or evaporating through the chimney or ventilator.

It is my desire to lessen the quantity of high-grade hops employed by more thoroughly extracting the valuable substances therefrom, and to the accomplishment of this I connect a boiler—such as now used—by a pipe, A', with a tank, A, hermetically closed. Upon the interior of tank A there is situated a coil of pipe, B, passing through the walls of the tank at points near the upper and lower ends thereof. That branch of the coil which protrudes through the tank-wall near the upper end is inserted into a casing, C, of a three-way cock, into opposite sides of which pipes D D' are tapped, the pipe D leading to a steam-supply and the one D' to a water-supply. The ports of the three-way cock B are so arranged that the coil B may be put into communication with either pipe D or D', as desired. Situated within the tank at a point slightly above its bottom is a perforated bottom, F, and tapped into the bottom of the tank is a discharge-pipe, G, which leads to the cooling device. The tank may be provided with a suitable man-hole, G', and steam-gage H.

Having described the apparatus used, I will now describe the process. The open boiler is first supplied with the regular quantity of wort, which is allowed to boil as long as necessary, and then a sufficient quantity of low-grade hops is added to precipitate the insoluble albuminoids. Before these low-grade hops are added to the wort a small quantity of said wort is drawn from the open boiler into the tank A. This wort is then supplied with high-grade hops in much smaller quantities than would have been necessary had the entire contents of the open boiler been supplied. This mixture of wort and high-grade hops is then subjected to the action of steam at high pressure, said steam being introduced to coil B through pipe D. After the mixture has been subjected to the action of the steam sufficiently long to extract all the resinous qualities from the hops and thoroughly impregnate the wort with the flavor of the hops the steam-supply is shut off, and the coil supplied with water to cool the mixture. After this operation has been performed the resulting beer is drawn off through pipe F and carried to the cooling device, where it is mixed with the beer which has been formed in the open boiler. As the beer is drawn from the tank A the hops are retained in said tank by perforated bottom G, and subsequently removed through man-hole G'.

By means of the process described it will be found that equally as beneficial results are obtained and as fine a flavor given to the beer through the medium of the small quantity of high-grade hops, and at least fifty per cent. saved.

I am aware of the existence of English Letters Patent No. 2,298 of 1866; but my invention differs from that described therein in that I employ in my process two different grades of hops, instead of two portions of the same grade, as described in such Letters Patent, and further, in that I subject my flavoring-hops to the action of heat, exceeding that of boiling water, in a closed vessel, while the invention referred to is described as running boiling wort through the flavoring-hops.

What I claim is—

The within-described process of brewing beer, which consists, first, in treating a given amount of wort in an ordinary open boiler; second, in drawing a small quantity thereof into a hermetic boiler; third, in mixing the wort remaining in the open boiler with low-grade hops and boiling the mixture; fourth, in mixing the wort in the hermetic boiler with a high grade of hops and subjecting the same to a heat above that of boiling water, and then cooling the same, and, fifth, in commingling the two mixtures in a suitable cooling device.

In testimony whereof I affix my signature in presence of two witnesses.

LEO ERNST.

Witnesses:
M. J. CLAGETT,
LOUIS NOLTING.